United States Patent
Yeh

(10) Patent No.: US 7,760,190 B2
(45) Date of Patent: Jul. 20, 2010

(54) REMOTE CONTROLLER WITH TOUCHPAD FOR RECEIVING HANDWRITTEN INPUT FUNCTIONS

(75) Inventor: I-Hau Yeh, Hsinchu (TW)

(73) Assignee: Elan Mircoelectronics Corporation, Hsinchu (TW)

( * ) Notice: Subject to any disclaimer, the term of this patent is extended or adjusted under 35 U.S.C. 154(b) by 1233 days.

(21) Appl. No.: 11/135,419

(22) Filed: May 24, 2005

(65) Prior Publication Data
US 2005/0264538 A1  Dec. 1, 2005

(30) Foreign Application Priority Data
May 25, 2004   (TW) .............................. 93114839 A

(51) Int. Cl.
*G06F 3/041*   (2006.01)
(52) U.S. Cl. ...................................... 345/173
(58) Field of Classification Search ................. 345/173, 345/157; 382/4, 13, 115, 119; 178/18.01–18.096
See application file for complete search history.

(56) References Cited

U.S. PATENT DOCUMENTS

| | | | | |
|---|---|---|---|---|
| 6,072,470 A | * | 6/2000 | Ishigaki | 345/158 |
| 7,047,339 B2 | * | 5/2006 | Oakley | 710/303 |
| 2002/0075244 A1 | * | 6/2002 | Tani et al. | 345/173 |
| 2002/0118131 A1 | * | 8/2002 | Yates et al. | 341/176 |
| 2003/0020693 A1 | * | 1/2003 | Nashida et al. | 345/169 |
| 2003/0038776 A1 | * | 2/2003 | Rosenberg et al. | 345/156 |
| 2004/0196270 A1 | * | 10/2004 | Chiu et al. | 345/174 |

* cited by examiner

*Primary Examiner*—Richard Hjerpe
*Assistant Examiner*—Shaheda A Abdin
(74) *Attorney, Agent, or Firm*—Rosenberg, Klein & Lee

(57) ABSTRACT

A remote controller comprises a touchpad having a handwriting region to be operated to generate an input signal, a driver coupled with the touchpad, and a microcontroller coupled with the driver to respond to the input signal to generate a control signal for a controlled apparatus, so as to give a command to the controlled apparatus, or to name a file or to search a file on the controlled apparatus. On the touchpad, several key patterns may be provided or one or more regions may be arranged, to provide various input functions of key mode, mouse mode, scroll mode or graphic mode.

33 Claims, 8 Drawing Sheets

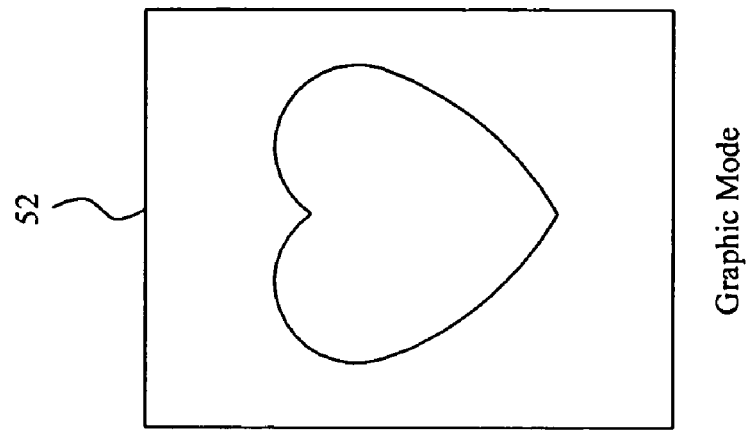
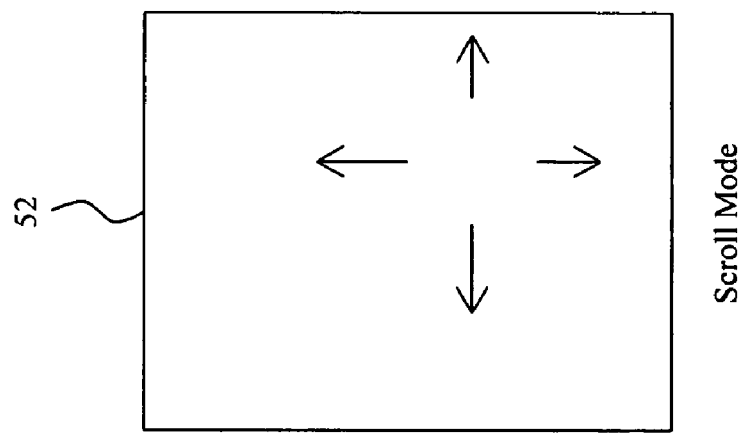
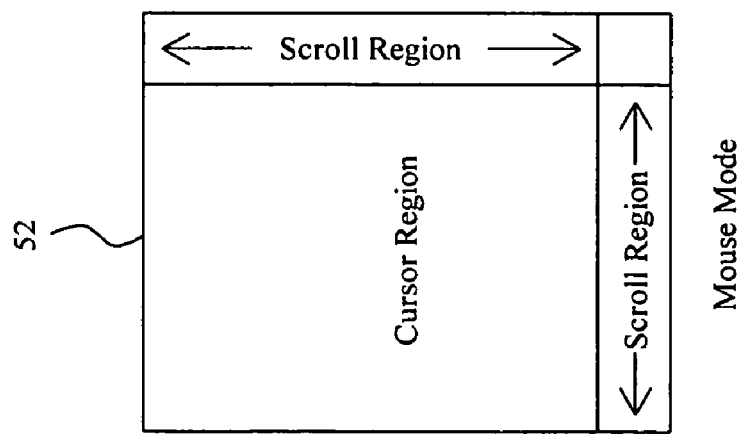
FIG. 9

REMOTE CONTROLLER WITH TOUCHPAD FOR RECEIVING HANDWRITTEN INPUT FUNCTIONS

FIELD OF THE INVENTION

The present invention is related generally to a remote controller and more particularly, to a remote controller having a touchpad for implementing input functions of the remote controller.

BACKGROUND OF THE INVENTION

Remote controllers have been widely used in various equipments in daily life, such as televisions (TV), video recorder/players, air-conditioners, cars, motorcycles, electric scrolling gates, lights, and projectors. Though remote controllers have the advantages of simple operation and low cost, they can only be operated with realistic keys and are thus limited for operational functions and other applications. Improvements to remote controllers have been made to expand the functionality, such as selecting a program list on a television. However, complicated operations of pressing the realistic keys keep users from using them. Moreover, users can only select programs or items from a fix list that is provided on a display, but not allowed to input words or symbols at his own choice. Thus, the resultant low controllability and poor flexibility could not satisfy the usages in future home entertainment audio/video (AV) products.

On the other hand, touchpads are well-known and low-cost devices, which are mainly used to provide mouse function in notebook computers. In spite of the advantages of a touchpad, its application is limited in computers and cannot be extended.

Therefore, it is desired to provide a new remote controller from a different point of view to increase the function of the remote controller enormously with the presumption of light, thin and low cost.

SUMMARY OF THE INVENTION

It is an aspect of the present invention to provide a remote controller having a touchpad for input operations.

It is another aspect of the present invention to provide a remote controller with more flexible operations.

It is a further aspect of the present invention to provide a remote controller having a handwriting input function.

It is yet another aspect of the present invention to provide a remote controller having improved functions.

According to the present invention, a remote controller comprises a touchpad having a handwriting region to be operated thereon, so as to generate an input signal, a driver coupled with the touchpad, and a microcontroller coupled with the driver to respond to the input signal to thereby generate a control signal for a controlled apparatus, so as to give a command to the controlled apparatus, or to name a file or to search a file on the controlled apparatus.

Alternatively, a plurality of key patterns are provided on the touchpad for input operations, and the key patterns serving as virtual keys behave as a realistic keyboard to implement keying input function. A mode switch is provided by one of the key patterns or a realistic key not on the touchpad, to switch the touchpad to a key mode or a handwriting mode.

Alternatively, the remote controller further comprises a recognition module to recognize the trace written on the touchpad or the number of fingers touching on the handwriting region for operating the controlled apparatus.

Alternatively, one or more regions are programmed on the touchpad to implement input functions such as mouse mode, scroll mode or graphic mode. A mode switch is provided by one of the key patterns or a realistic key not on the touchpad, to switch the touchpad between the various operational modes.

BRIEF DESCRIPTION OF DRAWINGS

These and other objects, features and advantages of the present invention will become apparent to those skilled in the art upon consideration of the following description of the preferred embodiments of the present invention taken in conjunction with the accompanying drawings, in which:

FIG. 9 is an illustration of the touchpad shown in FIG. 4 that is switched between various operational modes.

DETAILED DESCRIPTION OF THE INVENTION

Figure 1:
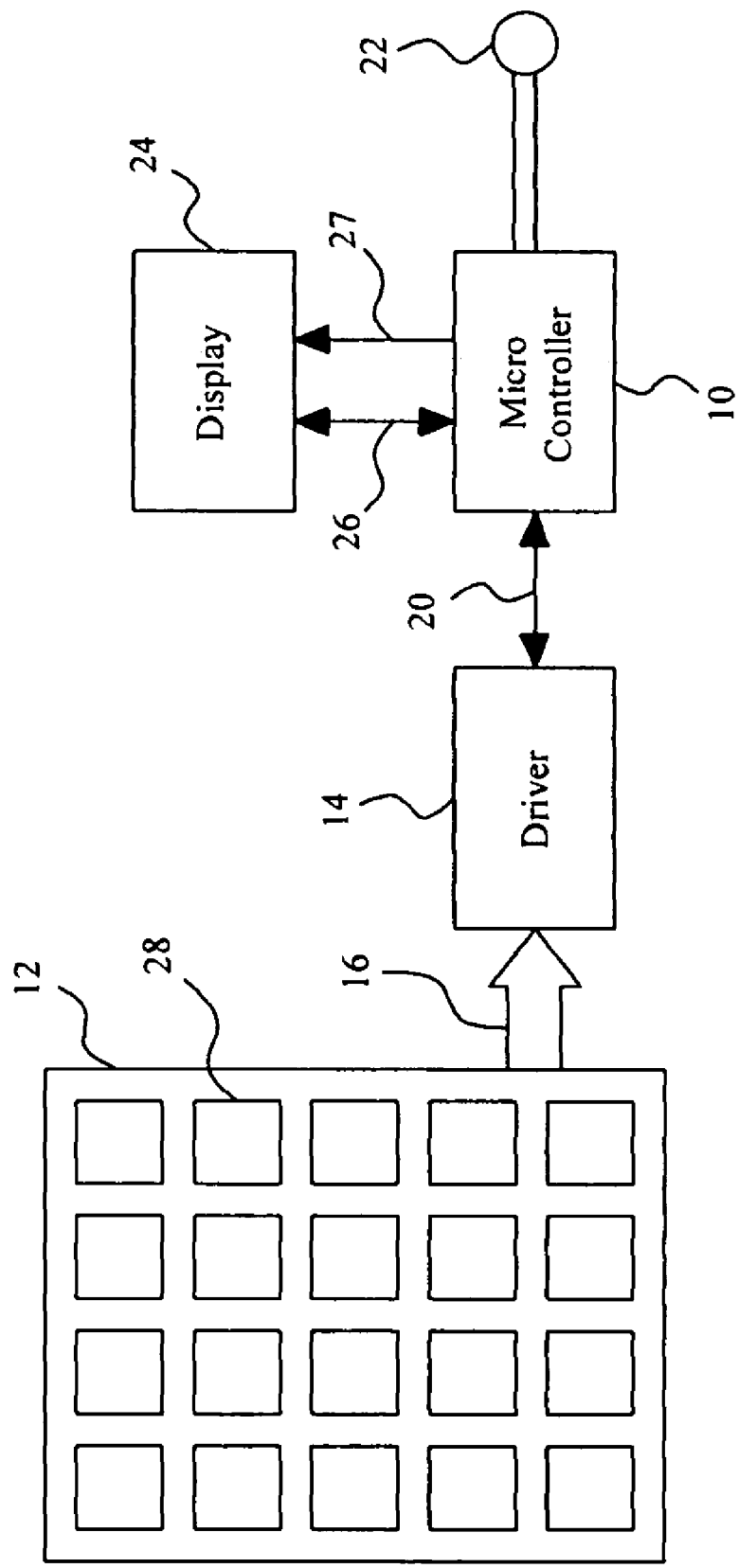
FIG. 1 shows an embodiment of a remote controller according to the present invention.

FIG. 1 shows an embodiment of a remote controller according to the present invention, which comprises a microcontroller 10 coupled with a touchpad 12 by a driver 14. The touchpad 12 may be a capacitive touchpad or a resistive touchpad, and it is used to generate an input signal 16 in response to operations thereon. In response to the input signal 16, the driver 14 asserts address data or a data signal 20 to the microcontroller 10. The microcontroller 10 is coupled with a signal generator 22 that is used to generate a remote control signal for operating a controlled apparatus in accordance with the input signal 16 or the operations on the touchpad 12. In other embodiments, the driver 14 and the microcontroller 10 can be integrated together. The specific circuitry of the driver 14 depends on the type of the touchpad 12, e.g., a capacitive touchpad or a resistive touchpad. In this embodiment, the driver 14 is used to drive the touchpad 12 and to transform the electronic signal 16 to address data or the data signal 20 for the microcontroller 10. The address data includes the information of the location and the motion of the user's finger operating on the touchpad 12. However, different touchpads have different driving methods. For example, if the touchpad 12 is a capacitive touchpad, the driver 14 will provide a sourcing or sinking current to charge or discharge the sensor of the touchpad 12, and if the touchpad 12 is a resistive touchpad, the driver 14 will apply a voltage to the sensor of the touchpad 12. The detailed components and operational principles of the touchpad 12 and the driver 14 are well known to those skilled in the art. The requirement to the driver 14 is the capability of driving the touchpad 12 to work, and the following processing to the output 16 of the touchpad 12 such as transforming the signal 16 to address data and reorganizing the information included in the signal 16, to implement various functions such as handwriting reorganization, graphic input, cursor control and scroll bar control, can all be performed in the microcontroller 10 or the driver 14, or one part in the microcontroller 10 and the other part in the driver 14.

The signal generator 22 may be an infrared (IR) generator or a radio frequency (RF) generator, to transmit a remote control signal with a communication format compatible with the controlled apparatus to proceed remote control operations. The remote controller may further comprise a display 24 coupled to the microcontroller 10 with a control bus 26 and a data bus 27. When a user operates the touchpad 12, the display 24 may display the input content or a prompt message for the user. The display 24 may be a liquid crystal display (LCD), an organic light-emitting diode (OLED) display or an electro-luminescent (EL) display. In different embodiments, the display 24 can be integrated on the remote controller or on the controlled apparatus. For entertainment appliances, for instance, the display 24 can be on the stereo panel, or otherwise, the display panel of a television or a video recorder/player that is operated by the remote controller may be serving as the display 24 when operating the remote controller.

Figure 2:
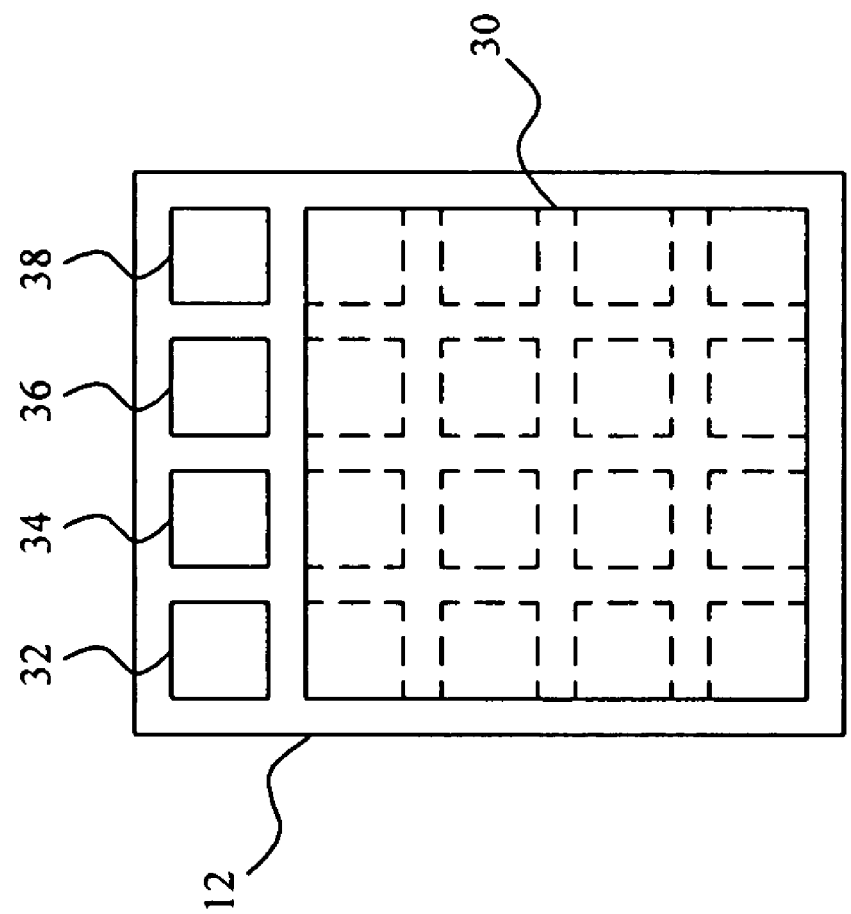
FIG. 2 is an illustration of the operatable region on the touchpad in the remote controller shown in FIG. 1.

The touchpad 12 has several key patterns 28 thereon, and each key pattern 28 simulates a realistic key such that the touchpad 12 functions as a keyboard. The key patterns 28 can be ones directly printed on the touchpad 12 or stamps attached on the touchpad 12. Fluorescent patterns may be used for the key patterns 28 to provide indication in a dark environment. The key patterns 28 on the touchpad 12 may be used to replace the realistic keys on a conventional remote controller. Since a typical touchpad is as thin as 1 mm, the thickness of the remote controller according to the present invention can be dramatically reduced. Moreover, a touchpad is a plate-like device, and no extra openings with predetermined sizes for the realistic keys are required on the case of a remote controller according to the present invention. The mechanism and the assembly of the remote controller are thus simplified. The key patterns 28 on the touchpad 12 can implement more functions, such as defining a new function key, a hot key integrated with multiple functions, or a fast key for user-defined menu. In other embodiments, in addition to the simulation of a keyboard, the touchpad 12 may be switched to other input modes, such as handwriting mode, graphic mode, mouse mode and scroll mode to perform other operations. In this case, a mode switch is provided on the remote controller to switch the touchpad 12 between different operational modes, and the mode switch can be a realistic key or a predefined virtual key using a key pattern 28 on the touchpad 12. Under a key mode, the touchpad 12 is programmed to serve as a keyboard as shown in FIG. 1, for keying operations with the key patterns 28. Under a handwriting mode, a part of or all the operatable region of the touchpad 12 becomes a handwriting region, and FIG. 2 is an illustration of the touchpad 12 for this mode. The most of the operatable region on the touchpad 12 becomes a handwriting region 30, and only the top four key patterns are left for simulating a mode switch 32, a menu key 34, a clear key 36, and an enter key 38. Under the handwriting mode, words, numbers, symbols or graphics inputted on the handwriting region 30 are recognized by a recognition module and shown on the display 24. The recognition module for the input on the handwriting region 30 may be integrated in the driver 14 or the microcontroller 10, or may be an individual part coupled to the driver 14 or the microcontroller 10. Pressing the mode switch 32 will determine the operational mode of the touchpad 12. The menu key 34 is used to call a predetermined menu or data list. The clear key 36 is used to clear or correct the words, numbers, symbols or graphics inputted on the handwriting region 30 or displayed on the display 24. Words, numbers, symbols or graphics inputted on the handwriting region 30 are sent to the microcontroller 10 for the recognition module thereof to recognize and display on the display 24. After finishing an input of a single word or a word string, by pressing the enter key 38, the word or word string will be transmitted to the controlled apparatus by the signal generator 22.

Figure 3:
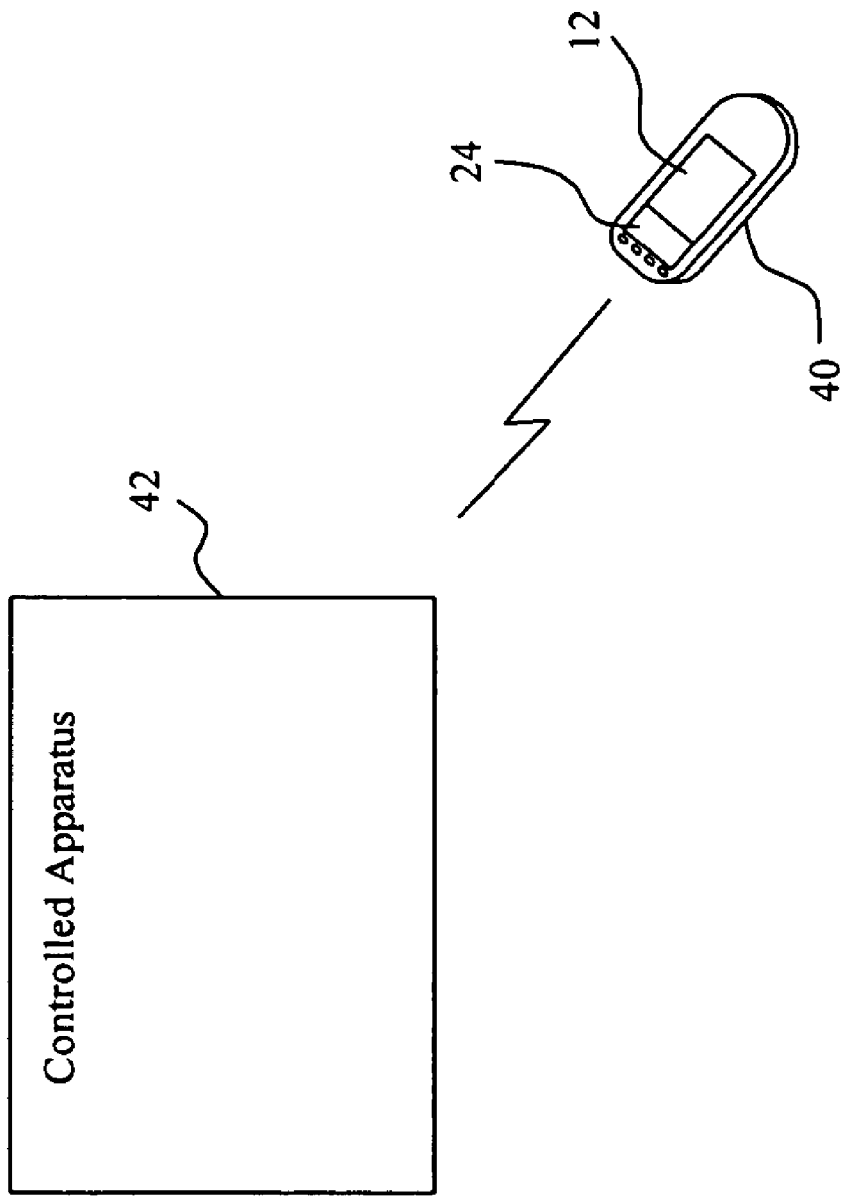
FIG. 3 is an illustration of using the remote controller shown in FIG. 1 to operate a controlled apparatus.

As shown in FIG. 3, a remote controller 40 including the apparatus shown in FIG. 1 is used to operate a controlled apparatus 42. In addition to some realistic keys, the remote controller 40 provides a key function and a handwriting function by the touchpad 12 thereon. During an operation, the input on the touchpad 12 is shown on the display 24 of the remote controller 40. The controlled apparatus 42 may be a digital AV equipment such as video recorder/player, digital AV disk player, digital video disc (DVD) player, stereo player, and home theater system, a digital information apparatus such as multimedia personal computer (PC), projector, and set-top-box (STB), or a home appliance such as television and air conditioner. In addition to usual operations, the remote controller 40 may provide more operational functions for manipulating the controlled apparatus 42, such as searching programs or songs on digital AV disk, set-top-box, high-definition television (HDTV) or digital television, or in system of movie-on-demand (MOD), video-on-demand (VOD), or multimedia-on-demand (MMOD). However, unlike a conventional remote controller, a user can input a keyword on the touchpad 12 for preceding a search command to search a file, a program or a song on the controlled apparatus 42. To name or rename a file is another function that a conventional remote controller could not provide. After selecting a specific file, a new file name is given thereto by writing it on the touchpad 12. These operational functions make a user to control or operate the controlled apparatus 42 more easily, and make the remote controller 40 to be more powerful, to create a user-defined program list and to name or rename a recorded program or a song.

Figure 4:
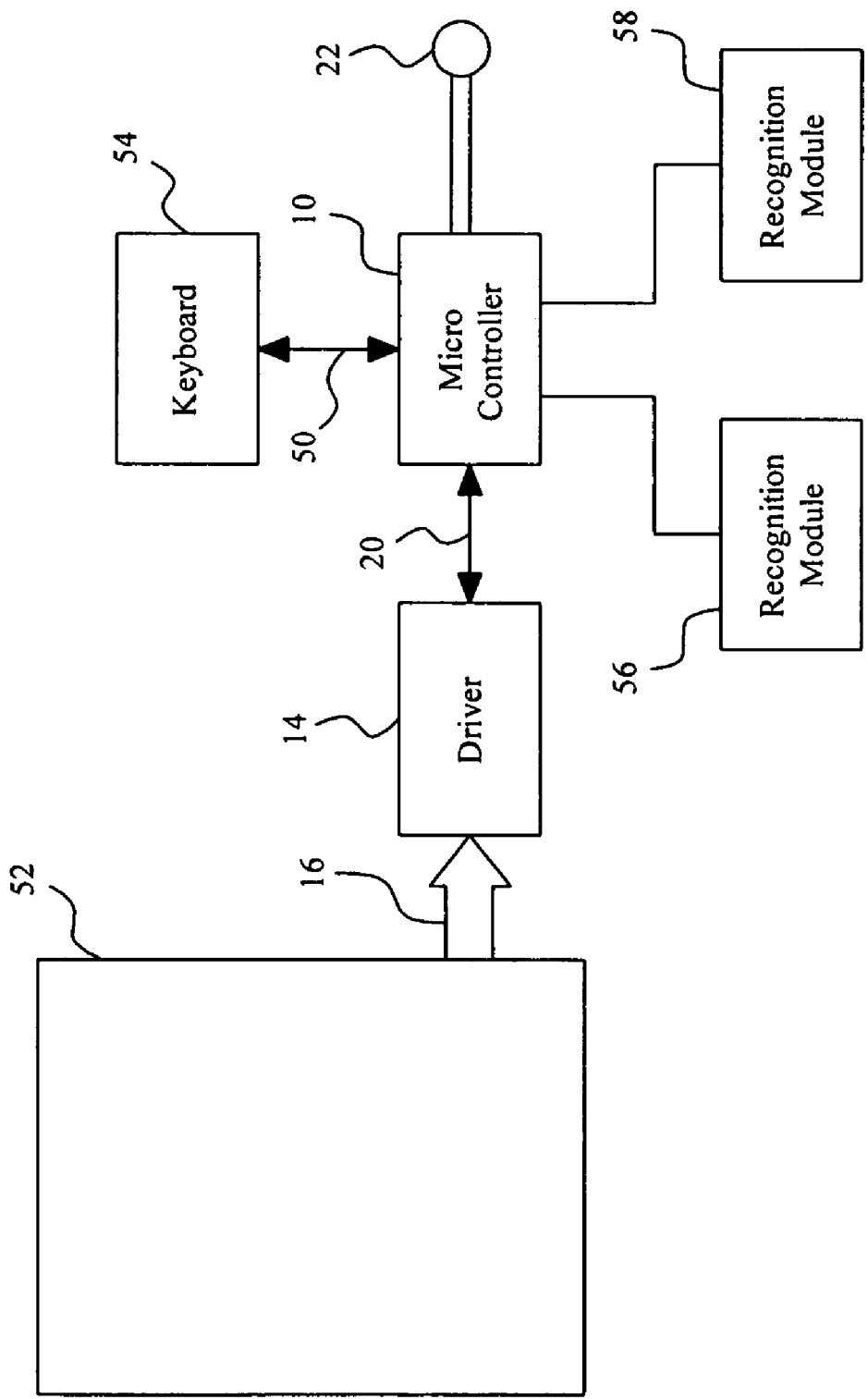
FIG. 4 shows another embodiment of a remote controller according to the present invention.
Figure 6:
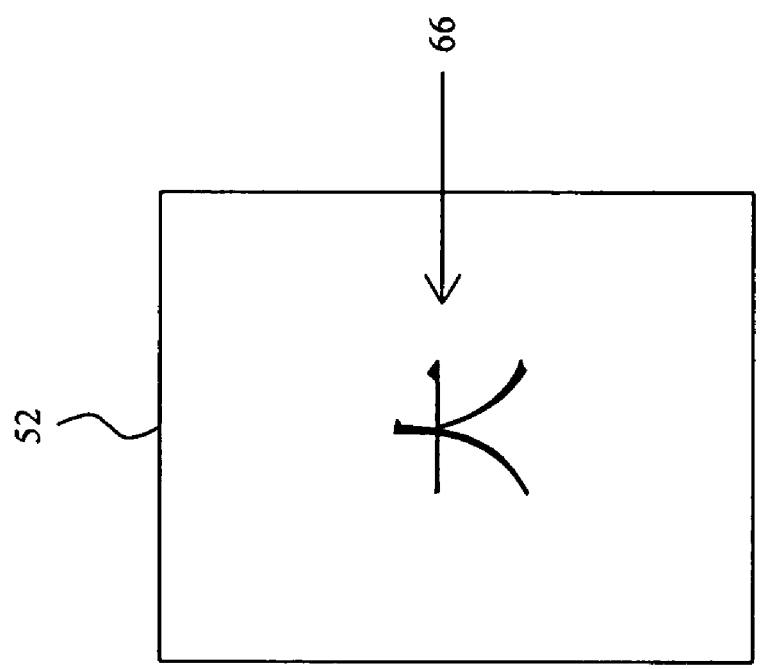
FIG. 6 shows a trace detected by the touchpad shown in FIG. 4 that is used to recognize the handwriting input on the touchpad.
Figure 5:
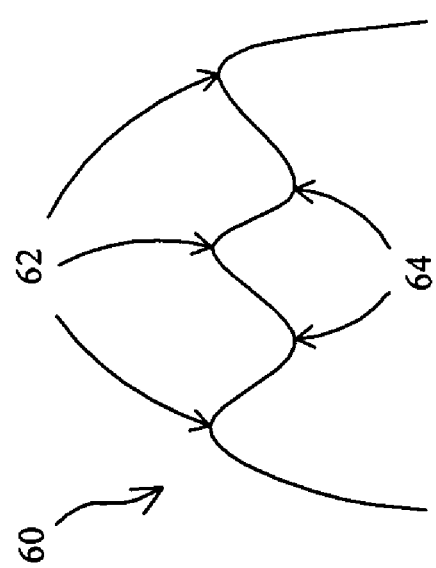
FIG. 5 shows a waveform of a signal detected by the touchpad shown in FIG. 4 that is used to determine the number of fingers touching on the touchpad.

FIG. 4 shows another embodiment of a remote controller according to the present invention, which also comprises the microcontroller 10, the driver 14 and the signal generator 22. In this embodiment, however, a touchpad 52 does not provide a key function. Instead, a realistic keyboard 54 coupled to the microcontroller 10 provides the key function. The touchpad 52 provides each mentioned function in the first embodiment except for the key function. The keyboard 54 is coupled to the microcontroller 10 with a bus 50 to generate a keying signal to the microcontroller 10 in response to user's operations. Two recognition modules 56 and 58 are included hereof. The recognition module 56 is used to detect the number of fingers touching on the touchpad 52, and as shown in FIG. 5 for example, a signal detected by the touchpad 52 has a waveform 60 including three peaks 62 divided by two valleys 64, which indicates there are three fingers touching on the touchpad 52 at the same time. Different numbers of fingers may stand for different commands to simplify the user's operations. On the other hand, the recognition module 58 is used to recognize the trace on the touchpad 52, and as shown in FIG. 6 for example, a trace 66 written on the touchpad 52 is recognized by the recognition module 58 into words, numbers, symbols or graphics. In other embodiments, the recognition modules 56 and 58 can be integrated in the driver 14 or the microcontroller 10.

Figure 8:
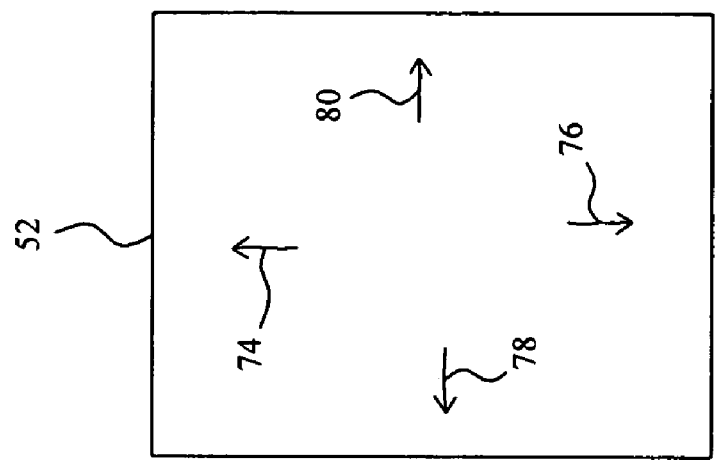
FIG. 8 is an illustration of a pen stroke on the touchpad to operate the remote controller shown in FIG. 4.
Figure 7:
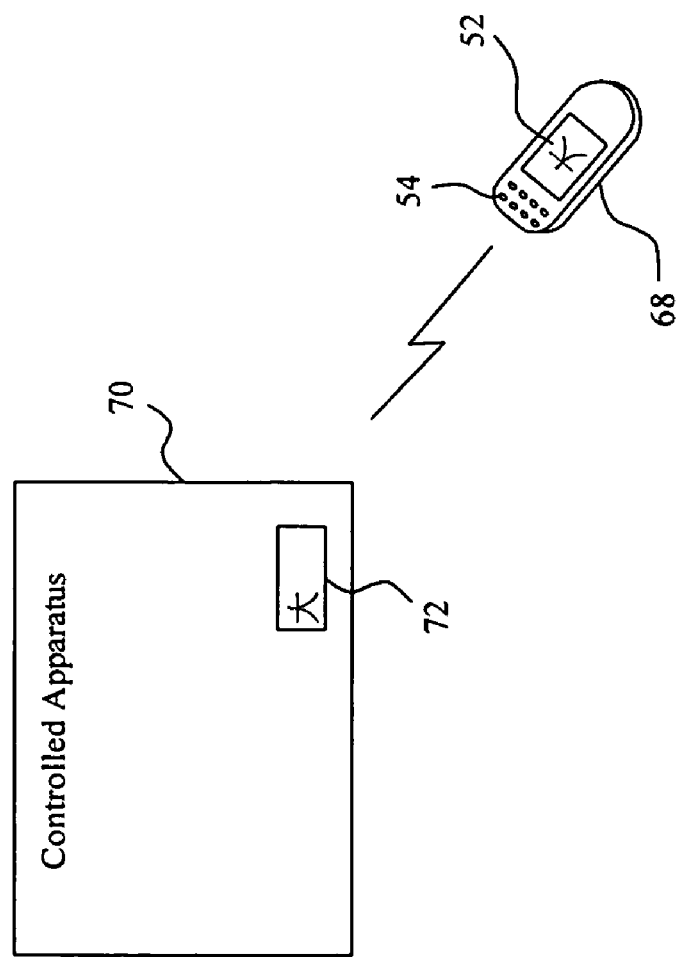
FIG. 7 is an illustration of using the remote controller shown in FIG. 4 to operate a controlled apparatus.

As shown in FIG. 7, a remote controller 68 including the apparatus shown in FIG. 4 is used to operate a controlled apparatus 70. No display is provided on the remote controller 68, and instead, a display 72 on the controlled apparatus 70 is used to display the words, numbers, symbols or graphics inputted on the touchpad 52. FIG. 8 is provided to illustrate a further function of the remote controller 68. Written on the touchpad 52, an upward pen stroke 74, a downward pen stroke 78, a leftward pen stroke 78 and a rightward pen stroke 80 are defined as four different commands, respectively. For example, the upward pen stroke 74 and the downward pen stroke 76 represent to scroll a menu upward and downward, respectively, the leftward pen stroke 78 represents an undo command, and the rightward pen stroke 80 represents an enter command. In other embodiments, the leftward pen stroke 78 and the rightward pen stroke 80 may be defined as forward motion and backward motion of a program on an AV apparatus, such as video recorder/player and DVD player. With the functions implemented by the touchpad 52, users will operate the controlled apparatus 70 more easily.

More operational modes may be further provided by a touchpad on a remote controller according to the present invention. As shown in FIG. 9, the touchpad 52 can be programmed to have one or more regions. By operating a mode switch on the remote controller 68, the touchpad 52 can be switched to a mouse mode, a scroll mode or a graphic mode. When the touchpad 52 is switched to the mouse mode, there are a cursor region, a horizontal scroll region and a vertical scroll region for a user to control the movement of a cursor on a monitor by operating on the cursor region and to scroll the horizontal and vertical scroll bars of a window on the monitor by operating on the horizontal and vertical scroll regions. Alternatively, under a mouse mode, only a cursor region is provided for the control of a cursor on a monitor. When the touchpad 52 is switched to the scroll mode, the whole operatable region of the touchpad 52 becomes a scroll region, on which a user may slip his finger to directly control a window on a monitor to scroll upward, downward, leftward and rightward, and/or to directly control a menu on the controlled apparatus 70 to move forward and backward, and/or to change menus on the controlled apparatus 70. Different from the scroll regions under the mouse mode, the operations on the scroll region under the scroll mode may directly scroll a window, move on a menu, or jump between menus. When the touchpad 52 is switched to the graphic mode, the whole operatable region of the touchpad 52 becomes a graphic region for graphic inputs thereon. By operating with fingers or pens directly on the graphic region, users are allowed to sketch drawings, edit drawings and send them to the controlled apparatus 70. The graphic mode is significantly different from the handwriting mode. Under the handwriting mode, when a user stops to write on the touchpad 52 for a while, the recognition module 58 of the remote controller 68 will automatically recognize the trace on the touchpad 52 for the input. However, the response time to determine the handwriting input may be adjusted upon user's request. While under the graphic mode, it is an enter command issued by the user to complete the graphic input on the touchpad 52.

Figure 10:
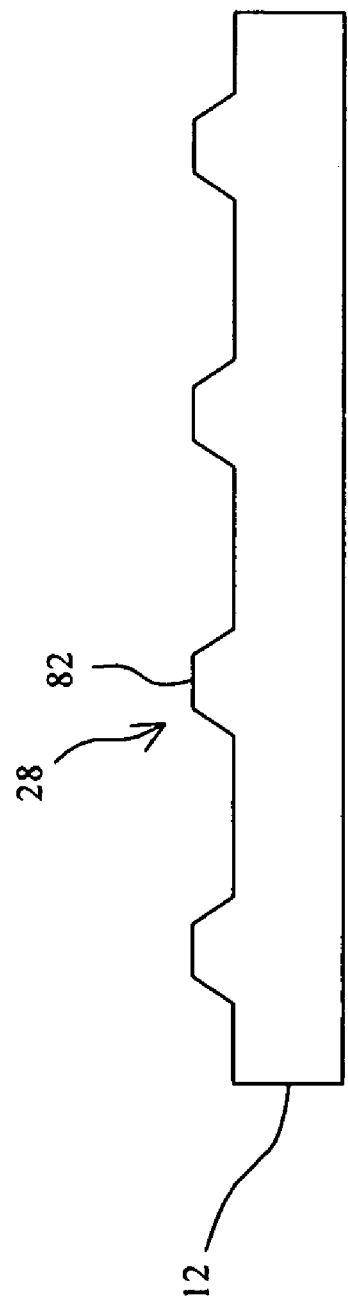
FIG. 10 is a cross-sectional view of an embodiment for the touchpad shown in FIG. 1.

In some embodiments, protrusion may be formed at one or more key patterns on a touchpad for the purpose of increasing the touch feeling of the operational finger, and with proper signal compensation, the operations of a handwriting input or under other operational modes will be the same as the operations on a planar touchpad. FIG. 10 is a cross-sectional view of an embodiment for the touchpad 12 shown in FIG. 1, on which protrusions 82 are formed at where the virtual keys are defined by the key patterns 28. When operating on the touchpad 12, the user may have much feeling of pressing the virtual keys from the protrusions 82. Alternatively, other profiles such as waving curved surfaces and rough surfaces may be formed on the touchpad 52 to increase the touch feeling for the user's finger.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A remote controller comprising:
   a touchpad having a plurality of key patterns and a handwriting region thereon, for being operated to thereby generate an input signal, whereby a user inputs text in the handwriting region to commence a search operation of the entered text on a controlled apparatus;
   a driver coupled with the touchpad;
   a signal generator; and
   a microcontroller coupled with the driver and the signal generator, for responding to the input signal to control the signal generator to generate a remote control signal for said controlled apparatus whereby said input text is displayed on said controlled apparatus; said signal generator for wirelessly transmitting said remote control signal;
   wherein the plurality of key patterns define a key pattern region, said key pattern region and the handwriting region being in at least partial overlapping relation each with respect to the other on the touchpad.

2. The remote controller of claim 1, wherein the signal generator comprises an IR generator or an RF generator.

3. The remote controller of claim 1, further comprising a mode switch for switching the touchpad to a key mode or a handwriting mode.

4. The remote controller of claim 3, wherein the mode switch further comprises a function of switching the touchpad to a mouse mode, a scroll mode or a graphic mode.

5. The remote controller of claim 3, wherein the mode switch is provided by one of the plurality of key patterns.

6. The remote controller of claim 1, wherein the touchpad comprises a capacitive touchpad or a resistive touchpad.

7. The remote controller of claim 1, wherein the plurality of key patterns comprise at least one fluorescent pattern.

8. The remote controller of claim 1, wherein the plurality of key patterns are printed on the touchpad.

9. The remote controller of claim 1, further comprising a display coupled to the microcontroller for responding to the input signal to display.

10. The remote controller of claim 9, wherein the display comprises an LCD, an OLED display or an EL display.

11. The remote controller of claim 1, wherein the touchpad has a protrusion at one of the plurality of key patterns.

12. The remote controller of claim 1, further comprising a recognition module coupled to the microcontroller for recognizing a trace on the handwriting region.

13. The remote controller of claim 1, further comprising a recognition module coupled to the microcontroller for recognizing a number of fingers touching on the handwriting region.

14. The remote controller of claim 1, wherein the input signal is to operate with a menu on the controlled apparatus.

15. The remote controller of claim 1, wherein the input signal is to search a file on the controlled apparatus.

16. The remote controller of claim 1, wherein the input signal is to name a file on the controlled apparatus.

17. The remote controller of claim 1, wherein the controlled apparatus comprises a digital AV apparatus, a digital information apparatus or a household electric appliance.

18. The remote controller of claim 1, wherein the driver and the microcontroller are integrated together.

19. A remote controller comprising:
- a plurality of keys for being operated to thereby generate a first input signal;
- a touchpad having a handwriting region for being operated to thereby generate a second input signal, wherein a user can input text in the handwriting region to commence a search operation of the entered text on a controlled apparatus;
- a driver coupled with the touchpad;
- a mode switch for switching the touchpad to a mouse mode, a scroll mode or a graphic mode;
- a signal generator; and
- a microcontroller coupled with the plurality of keys, the driver and the signal generator, for responding to the first and second input signals to control the signal generator to generate a remote control signal for said controlled apparatus whereby said input text is displayed on said controlled apparatus; said signal generator for wirelessly transmitting said remote control signal.

20. The remote controller of claim 19, wherein the signal generator comprises an IR generator or an RF generator.

21. The remote controller of claim 19, wherein the touchpad comprises a capacitive touchpad or a resistive touchpad.

22. The remote controller of claim 19, further comprising a display coupled to the microcontroller for responding to the second input signal to display.

23. The remote controller of claim 22, wherein the display comprises an LCD, an OLED display or an EL display.

24. The remote controller of claim 19, wherein the mode switch is on the touchpad.

25. The remote controller of claim 19, further comprising a recognition module coupled to the microcontroller for recognizing a trace on the handwriting region.

26. The remote controller of claim 19, further comprising a recognition module coupled to the microcontroller for recognizing a number of fingers touching on the handwriting region.

27. The remote controller of claim 19, wherein the second input signal is to operate with a menu on the controlled apparatus.

28. The remote controller of claim 19, wherein the second input signal is to search a file on the controlled apparatus.

29. The remote controller of claim 19, wherein the second input signal is to name a file on the controlled apparatus.

30. The remote controller of claim 19, wherein the controlled apparatus comprises a digital AV apparatus, a digital information apparatus or a household electric appliance.

31. The remote controller of claim 19, wherein the driver and the microcontroller are integrated together.

32. A remote controller comprising:
- a touchpad having a plurality of key patterns and a handwriting region thereon, for being operated to thereby generate an input signal, wherein a user can input text in the handwriting region to commence a search operation of the entered text on a controlled apparatus;
- a driver coupled with the touchpad;
- a mode switch for switching the touchpad to a key mode or a handwriting mode;
- a signal generator; and
- a microcontroller coupled with the driver and the signal generator, for responding to the input signal to control the signal generator to generate a remote control signal for said controlled apparatus whereby said input text is displayed on said controlled apparatus; said signal generator for wirelessly transmitting said remote control signal.

33. The remote controller of claim 32, wherein the mode switch further comprises a function of switching the touchpad to a mouse mode, a scroll mode or a graphic mode.

* * * * *